US012160557B2

(12) United States Patent
Sundram et al.

(10) Patent No.: US 12,160,557 B2
(45) Date of Patent: Dec. 3, 2024

(54) METHOD FOR SIMULATING THE ILLUMINATION OF AN INDOOR SCENE OBSERVED BY A CAMERA ILLUMINATED BY OUTDOOR LIGHT AND SYSTEM (71) Applicants: TOYOTA JIDOSHA KABUSHIKI KAISHA, Toyota (JP); Albert-Ludwigs-Universitaet Freiburg, Freiburg (DE)

(72) Inventors: Jugesh Sundram, Brussels (BE); Mark Van Loock, Brussels (BE); Michael Krawez, Freiburg (DE); Tim Caselitz, Freiburg (DE); Wolfram Burgard, Freiburg (DE)

(73) Assignees: TOYOTA JIDOSHA KABUSHIKI KAISHA, Toyota (JP); ALBERT-LUDWIGS-UNIVERSITAET FREIBURG, Freiburg (DE)

( * ) Notice: Subject to any disclaimer, the term of this patent is extended or adjusted under 35 U.S.C. 154(b) by 394 days.

(21) Appl. No.: 17/679,597

(22) Filed: Feb. 24, 2022

(65) Prior Publication Data

US 2022/0279156 A1    Sep. 1, 2022

(30) Foreign Application Priority Data

Feb. 26, 2021   (EP) ..................................... 21159737

(51) Int. Cl.
*G06K 9/00* (2022.01)
*F21V 33/00* (2006.01)
(Continued)

(52) U.S. Cl.
CPC ....... *H04N 13/254* (2018.05); *F21V 33/0052* (2013.01); *H04N 13/275* (2018.05); *F21S 10/00* (2013.01); *F21W 2121/008* (2013.01)

(58) Field of Classification Search
CPC .......................... H04N 13/254; H04N 13/275; F21V 33/0052; F21S 10/00; F21W 2121/008

(Continued)

(56) References Cited

U.S. PATENT DOCUMENTS

2017/0345208 A1* 11/2017 Ashdown ............. G05B 19/042
2019/0215932 A1*  7/2019 Ashdown ............... H05B 45/20

FOREIGN PATENT DOCUMENTS

EP            3859684 A1     8/2021

OTHER PUBLICATIONS

Chan, Ying-Chieh, and Athanasios Tzempelikos. "A hybrid ray-tracing and radiosity method for calculating radiation transport and illuminance distribution in spaces with venetian blinds." Solar energy 86.11 (2012): 3109-3124. (Year: 2012).*

(Continued)

*Primary Examiner* — Jonathan S Lee
(74) *Attorney, Agent, or Firm* — Dinsmore & Shohl LLP (57) ABSTRACT A method for simulating, at an instant, the illumination of an indoor scene observed by a camera and being illuminated by outdoor light, the method comprising: a first preliminary phase including: obtaining a reflectance map of the scene elaborating normalized radiosity maps for the contribution of the sky and the ground, a second phase carried out within a first given duration from the instant including: obtaining the position of the sun, obtaining a normalized radiosity map for the contribution of the sun, a third phase, including: acquiring an image of the scene, determining brightness scale parameters for the ground, the sky, and the sun. The disclosure also proposes tracking the camera position.

11 Claims, 5 Drawing Sheets

(51) Int. Cl.
    *H04N 13/254* (2018.01)
    *H04N 13/275* (2018.01)
    *F21S 10/00* (2006.01)
    *F21W 121/00* (2006.01)
(58) Field of Classification Search
    USPC .......................................................... 382/154
    See application file for complete search history.

(56) References Cited

OTHER PUBLICATIONS

Xiong, Jie, and Athanasios Tzempelikos. "Model-based shading and lighting controls considering visual comfort and energy use." Solar Energy 134 (2016): 416-428. (Year: 2016).*

Krawez Michael et al: "Real-Time Outdoor Illumination Estimation for Camera Tracking in Indoor Environments", IEEE Robotics and Automation Letters, IEEE, vol. 6, No. 3, Jun. 18, 2021 (Jun. 18, 2021), pp. 6084-6091.

Caselitz Tim et al: "Camera Tracking in Lighting Adaptable Maps of Indoor Environments", 2020 IEEE International Conference On Robotics and Automation (ICRA), IEEE, May 31, 2020 (May 31, 2020), pp. 3334-3340.

Krawez Michael et al: "Building Dense Reflectance Maps of Indoor Environments Using an RGB-D Camera", 2018 IEEE/RSJ International Conference On Intelligent Robots and Systems (IROS), IEEE, Oct. 1, 2018 (Oct. 1, 2018), pp. 3210-3217.

Ayoub Mohammed Ed—Ho Yun Jae et al: "A review on light transport algorithms and simulation tools to model daylighting inside buildings", Solar Energy, Elsevier Ltd, vol. 198, Feb. 13, 2020 (Feb. 13, 2020), pp. 623-642.

C.M. Goral, K. E. Torrance, D. P. Greenberg, and B. Battaile, "Modeling the interaction of light between diffuse surfaces", in ACM SIGGRAPH Computer Graphics, vol. 18, No. 3, 1984.

H. Kolivand, A. El Rhalibi, M. S. Sunar, and T. Saba, "Revitage: Realistic virtual heritage taking shadows and sky illumination into account", Journal of Cultural Heritage, vol. 32, 2018.

P. R. Tregenza and I. Waters, "Daylight coefficients"; Lighting Research & Technology, vol. 15, No. 2, pp. 65-71, 1983.

D. Bourgeois, C. F. Reinhart, and G. Ward, "Standard daylight coefficient model for dynamic daylighting simulations", Building Research & Information, vol. 36, No. 1, 2008.

G. Besuievsky, E. Fernandez, J. P. Aguerre, and B. Beckers, "A radiosity-based methodology considering urban environments for assessing daylighting"; Journal of Physics: Conference Series, vol. 1343, No. 1. IOP Publishing, 2019, p. 012156.

T. Jensen, M. S. Andersen, and C. B. Madsen, "Real-time image based lighting for outdoor augmented reality under dynamically changing illumination conditions", GRAPP, vol. 6, pp. 364-371, 2006.

W.- C. Ma, S. Wang, M. A. Brubaker, S. Fidler, and R. Urtasun, "Find your way by observing the sun and other semantic cues", 2017 IEEE International Conference on Robotics and Automation (ICRA), IEEE, 2017, pp. 6292-6299.

L. Clement, V. Peretroukhin, and J. Kelly, "Improving the accuracy of stereo visual odometry using visual illumination estimation", arXiv:1609.04705v3 [cs.RO] Aug. 8, 2019.

T. Mashita, A. Plopski, A. Kudo, T. Hollerer, K. Kiyokawa, and H. Takemura, "Simulation based camera localization under a variable lighting environment", ICAT-EGVE, 2016, pp. 69-76.

Y. Liu and X. Granier, "Online tracking of outdoor lighting variations for augmented reality with moving cameras", IEEE Transactions on visualization and computer graphics, vol. 18, No. 4, 5 pp. 573-580, 2012.

Sundram Jugesh et al. European Patent Application 20154742.9 filed on Jan. 30, 2020.

* cited by examiner

METHOD FOR SIMULATING THE ILLUMINATION OF AN INDOOR SCENE OBSERVED BY A CAMERA ILLUMINATED BY OUTDOOR LIGHT AND SYSTEM

CROSS-REFERENCE TO RELATED APPLICATIONS

This application claims priority to European Patent Application No. 21159737.2 filed on Feb. 26, 2021, incorporated herein by reference in its entirety.

FIELD OF THE DISCLOSURE

The present disclosure is related to the field of image processing, in particular to a method and system for simulating the illumination of an indoor scene observed by a camera.

DESCRIPTION OF THE RELATED ART

Visual camera tracking, or egomotion estimation, has been an important research field in robotics and computer vision. These methods provide the pose of a camera observing a scene.

Direct methods to estimate a pose, which are based on measurements made from all the pixels to estimate the pose, have been observed to be more precise and robust than feature-based methods which only rely on a limited number of pixels.

The performance of direct methods is known to be sensitive to illumination conditions. Document "Camera tracking in lighting adaptable maps of indoor environments" (T. Caselitz, M. Krawez, J. Sundram, M. Van Loock, and W. Burgard, in IEEE International Conference on Robotics and Automation (ICRA)) addressed this problem by adjusting a map to a current scene illumination. This map was represented by a 3D mesh with surface reflectance and radiosity information. The solution of this document consisted in detecting and segmenting artificial light sources (i.e. lamps), and to use the method known as "radiosity transport" from document "Modeling the interaction of light between diffuse surfaces" (C. M. Goral, K. E. Torrance, D. P. Greenberg, and B. Battaile, in ACM SIGGRAPH Computer Graphics, vol. 18, no. 3, 1984) to pre-compute the illumination components for each artificial light source. Tracking was described in this document as comprising the detection of the set of lamps currently switched on and combining the corresponding illumination components to predict the scene appearance in real time. Tracking against the adjusted map has been observed to be more stable than without illumination adaptation.

This solution is limited to indoor scenes which are not affected by outdoor light. During daytime, indoor environment are typically illuminated by outdoor light coming through windows. Outdoor illumination depends on several parameters which change dynamically, and most importantly the position of the sun which changes through the course of the day. Weather conditions also contribute to rapid lighting changes, e.g. clouds moving in front of the sun. Because direct sun light usually alters the scene appearance more dramatically than artificial light sources, it is desirable to incorporate outdoor illumination into a predictive environment model.

Consequently, it appears that the method of document "Camera tracking in lighting adaptable maps of indoor environments" cannot be used in situations where outdoor lighting affects the illumination.

Outdoor illumination has been studied in different fields and more precisely in the field of augmented reality. Typically, outdoor illumination is taken into account to render a virtual object into a real scene. These solutions do not aim at obtaining a simulation of the illumination of the scene which matches the actual scene.

The documents discussed below present the known related art.

Daylight modeling has also been used in architectural design and document "Daylight coefficients" (P. R. Tregenza and I. Waters, Lighting Research & Technology, vol. 15, no. 2, pp. 65-71, 1983) discloses an illumination one such illumination model. Documents "Standard daylight coefficient model for dynamic daylighting simulations" (D. Bourgeois, C. F. Reinhart, and G. Ward, Building Research & Information, vol. 36, no. 1, pp. 68-82, 2008) and "A radiosity-based methodology considering urban environments for assessing daylighting," (G. Besuievsky, E. Fern´andez, J. P. Aguerre, and B. Beckers in Journal of Physics: Conference Series, vol. 1343, no. 1. IOP Publishing, 2019, p. 012156) disclose improvements to this model. These solutions cannot handle rapid changes of lights.

Document "Revitage: Realistic virtual heritage taking shadows and sky illumination into account" (H. Kolivand, A. El Rhalibi, M. S. Sunar, and T. Saba, Journal of Cultural Heritage, vol. 32, pp. 166-175, 2018) discloses blending a virtual building model into a real outdoor scene. An atmosphere model is used in this document.

Document "Real-time image based lighting for outdoor augmented reality under dynamically changing illumination conditions" (T. Jensen, M. S. Andersen, and C. B. Madsen, GRAPP, vol. 6, pp. 364-371, 2006), discloses a solution to illuminate an object with a static camera pose and is not applicable to the illumination of a scene.

Document "Find your way by observing the sun and other semantic cues" (W.-C. Ma, S. Wang, M. A. Brubaker, S. Fidler, and R. Urtasun, in 2017 IEEE International Conference on Robotics and Automation (ICRA), IEEE, 2017, pp. 6292-6299) discloses a method to use sun direction to improve global outdoor localization in the context of autonomous driving. This document proposes to estimate the sun position relative to a carby using a Convolution Neural Network to obtain the car orientation by comparing it to the true sun direction computed in real time.

Document "Improving the accuracy of stereo visual odometry using visual illumination estimation" (L. Clement, V. Peretroukhin, and J. Kelly, In International Symposium on Experimental Robotics. Springer, 2016) teaches to deploy the sun location to reduce angular drift in a visual odometry method. Document "Simulation based camera localization under a variable lighting environment" (T. Mashita, A. Plopski, A. Kudo, T. H¨ollerer, K. Kiyokawa, and H. Takemura, in ICAT-EGVE, 2016, pp. 69-76) discloses a method for outdoor illumination prediction to improve feature-based localization. In this document, point features are detected on a 3D model of a building and then the feature appearance is predicted by rendering the model for different outdoor lighting conditions. The appearance variation of each feature point is stored as a distribution over the descriptor vectors and the document describes how those can be used for image matching. Document "Online tracking of outdoor lighting variations for augmented reality with moving cameras" (Y. Liu and X. Granier, IEEE Transactions on visualization and computer graphics, vol. 18, no. 4, pp. 573-580, 2012) proposes to estimate the dynamic sun and sky brightness in a video of an outdoor scene, captured by a moving camera. This document teaches to derive the sun position from geolocation and time, and also to assume that a coarse scene geometry is provided. In this document a simple shadow model is used.

SUMMARY OF THE DISCLOSURE

The present disclosure overcomes one or more deficiencies of the related art by proposing a method for simulating, at an instant, the illumination of an indoor scene observed by a camera and being illuminated by outdoor light, the method comprising:

a first preliminary phase including:
  obtaining a 3D geometric model of the scene (i.e. a 3D mesh of the scene, either predetermined or computed from an image of the scene),
  obtaining image information of the scene (for example, image information can be acquired by an RGB or an RGBD sensor and can comprise one or more images, of a stream of images forming a video, for example with the camera being static or alternatively the camera moving),
  obtaining a reflectance map (i.e. a map which indicates a reflectance at each vertex in the 3D geometric model) of the scene for the contribution of outdoor illumination to the scene based on the 3D geometric model of the scene and the image information,
  elaborating a normalized radiosity map for the contribution of the sky to the outdoor illumination based on the reflectance map,
  elaborating a normalized radiosity map for the contribution of the ground to the outdoor illumination based on the reflectance map,
a second phase carried out within a first given duration from the instant including:
  obtaining the position of the sun using the geolocation, the time, and the orientation of the scene (either provided or calculated from an acquired image),
  obtaining a normalized radiosity map for the contribution of the sun to the outdoor illumination based on the position of the sun and the reflectance map, a third phase carried out within a second given duration from the instant, shorter than the first given duration, including:
acquiring at least one image of the scene (using the camera), determining from the at least one image a brightness scale parameter for the contribution of the ground, a brightness scale parameter for the contribution of the sky, and a brightness scale parameter for the contribution of the sun.

The above method applies to indoor scenes which have an opening on the outside (windows, doors, etcs) though which outdoor illumination can propagate.

The normalized radiosity maps and the corresponding brightness scale parameters form the simulation of the illumination of the indoor scene at the instant. By way of example, it is possible to render a simulated image of the scene from the radiosity maps and the brightness scale parameters, the rendered image being considered to be a simulation of the illumination in the present application. The disclosure is however not limited to rendering images and applies to other applications in which radiosity maps and brightness scale parameters are used to obtain a (non-normalized) radiosity map of the illumination of the scene, and this radiosity map can be considered to be a simulation of the illumination.

Thus, the method proposes to leverage the lighting intensity obtained from the image acquired in the third phase to reflect the actual brightness in the scene, whereas many methods of the related art propose to use an analytical model to obtain the brightness of various components.

The preliminary phase can be performed once for an indoor scene. The second phase can be performed regularly, typically every 5 minutes (the first duration can be of the order of several minutes), as the sun moves slowly during the day. The third phase allows performing nearly real time computation and the second duration can be of less than a second, for example to reflect the framerate of the camera. Thus, using these three phases results in a simulation which better reflects the actual illumination, and which limits the computational complexity as a portion of the calculation is done once (first phase), at a low frequency (second phase), and in near real time (third phase).

The reflectance is defined as the ratio between the incoming light and the reflected light (the radiosity) and can be defined for each vertex of the 3D geometry model. Document "Building dense reflectance maps of indoor environments using an rgb-d camera" (M. Krawez, T. Caselitz, D. Büscher, M. Van Loock, and W. Burgard, in 2018 IEEE/RSJ International Conference on Intelligent Robots and Systems (IROS). IEEE, 2018, pp. 3210-3217) discloses how to obtain reflectance maps and radiosity maps.

The above cited document "Camera tracking in lighting adaptable maps of indoor environments" further discloses how to obtain radiosity maps/reflectance maps. Also, European Patent Application 20 154 742.9 filed on Jan. 30, 2020, the contents of which are incorporated by reference in the present application, also discloses how to obtain radiosity maps/reflectance maps from image information.

In fact, the present method is based on the "radiosity transport" methods.

It should be noted that in the present method, normalized radiosity maps are first obtained before radiosity maps. The wording "normalized" indicates that a scale parameter can multiply the normalized radiosity to obtain an actual radiosity map. In fact, a normalized radiosity map indicates the spatial light distribution in the scene induced by a light source (here light sources associated with the sky, the ground, and the sun, in other words outdoor light sources), with values being scalable so as to reach the actual light source brightness.

Elaborating a normalized radiosity map includes affecting a normalized radiosity value to light sources corresponding to either the ground, the sky, or the sun. These light sources can be virtual (i.e. only existing in the calculations of the present method) and located (or considered to be located as they are virtual) where the sun/ground/sky are expected to be.

It should be noted that the inventors of the present disclosure have observed that a good simulation is obtained by separating the light from the sky, the ground, and the sun (direct illumination) so that the third phase mainly comprises a determination of three brightness scale parameters: the computational complexity of the third phase is limited and the simulation is satisfactory.

According to a particular embodiment, obtaining the reflectance map comprises considering a plurality of light sources arranged on a sphere centered on the scene.

Thus, the light sources which are considered for the radiosity transport method, for example, are simulated light sources placed along a sphere. The number of light sources (points in space) to be considered can be chosen in accordance with an accuracy parameter depending on the application. The outside environment is thus simplified and does not take into account the exact geometry of, for example, buildings outside the indoor scene.

By considered, what is meant is that in the reflectance calculation, light impinging on each surface (i.e. the radiosity) is considered to originate from one of these points (the above mentioned virtual light sources). Also, the expression "considered" indicates that each point will be taken into account for the calculation of the reflectance. Indeed, measured radiosity values can be obtained to recover the reflectance values in a manner known in itself in the art (for example known for indoor light sources).

According to a particular embodiment, elaborating a normalized radiosity map for the contribution of the sky to the outdoor illumination based on the reflectance map comprises only considering the light sources in the upper half of the sphere, and elaborating a normalized radiosity map for the contribution of the ground to the outdoor illumination based on the reflectance map comprises only considering the light sources in the lower half of the sphere.

The above mentioned sphere is cut in half horizontally to obtain two hemispheres, one used in the calculation of the radiosity map for illumination coming from the sky, one for the illumination coming from the ground.

In this step, light sources/points in each hemisphere/half-sphere are each affected with a radiosity value.

According to a particular embodiment, the preliminary phase comprises a ray-tracing step to determine the visibility of each vertex of the 3D geometric model, the method further comprising using the visibilities to obtain the normalized radiosity maps for the contribution of the sky, of the ground, and of the sun.

This ray-tracing step can use predetermined pose information for the camera.

Also, the visibility can be used in the step of obtaining a reflectance map.

According to a particular embodiment, obtaining the reflectance map comprises using image information of the scene acquired when there is no direct sunlight entering the scene.

This particular embodiment is adapted for indoor scenes that do not receive direct sunlight because of their orientation (and more precisely the direction in which their openings are facing).

In a particular embodiment, which is an alternative to the previously defined particular embodiment, obtaining the reflectance map comprises using image information of the scene acquired when there is direct sunlight entering the scene at different instants associated with different positons of the sun.

It has been observed that when there is direct sunlight entering a room, the minimal exposure time of most RGB-D cameras is not short enough to capture the sun's radiosity needed to recover the reflectance (i.e looking directly at the sun could not allow obtaining a radiosity value for a light source placed at the sun's position). However, by using image information acquired at different instants each associated with different sun positions, it has been observed that it is possible to obtain a reflectance map.

According to a particular embodiment, the method comprises (in the third phase) rendering a normalized image of the scene for the contribution of the sky to the outdoor illumination of the scene based on the normalized radiosity map for the contribution of the sky to the outdoor illumination, rendering a normalized image of the scene for the contribution of the ground to the outdoor illumination of the scene based on the normalized radiosity map for the contribution of the sky to the outdoor illumination, and rendering a normalized image of the scene for the contribution of the sun to the outdoor illumination of the scene based on the normalized radiosity map for the contribution of the sky to the outdoor illumination.

Rendering these three images facilitates obtaining the brightness scale parameters.

According to a particular embodiment, determining from the image a brightness scale parameter for the contribution of the ground, a brightness scale parameter for the contribution of the sky, and a brightness scale parameter for the contribution of the sun, comprises minimizing a difference between the image and a linear combination of the products of each brightness scale parameter with the corresponding normalized image.

According to a particular embodiment, the third phase comprises acquiring a plurality of images of the scenes at different instants and determining the brightness scale parameters uses the plurality of images.

By way of example, a sliding window may be used to collect continuously images of the scene and these images may also be used in the above mentioned minimization to obtain the brightness scale parameters.

According to a particular embodiment, the method comprises elaborating an image of the scene from the normalized images of the scene and the brightness scale parameters.

The disclosure also proposes a method for tracking the position of a camera observing a scene (also called visual odometry or egomotion) over a plurality of instants, using the simulated illumination of the indoor scene by the method for simulating the illumination of an indoor scene as defined above at every instant of the plurality of instants.

The disclosure proposes to leverage information from the simulation results to perform the tracking, as this has been observed to be more robust than by using only images from the camera.

The disclosure is therefore perfectly applicable in contexts where the pose of the camera changes.

According to a particular embodiment, the method for simulating the illumination of an indoor scene is the method as defined above wherein normalized images rendered in accordance with the particular embodiment defined above, and wherein tracking is performed on the image elaborated from the normalized images of the scene and the brightness scale parameters.

The disclosure also provides a system comprising a camera (RGB or RBGD) and a control unit configured to perform any embodiment of the method for simulating or the method for tracking as defined above.

By way of example, this system can be a computer system. The disclosure also provides a vehicle including this system.

In one particular embodiment, the steps of the method are determined by computer program instructions.

Consequently, the disclosure is also directed to a computer program for executing the steps of a method as described above when this program is executed by a computer.

This program can use any programming language and take the form of source code, object code or a code intermediate between source code and object code, such as a partially compiled form, or any other desirable form.

The disclosure is also directed to a computer-readable information medium containing instructions of a computer program as described above.

The information medium can be any entity or device capable of storing the program. For example, the medium can include storage device such as a ROM, for example a CD ROM or a microelectronic circuit ROM, or magnetic storage device, for example a diskette (floppy disk) or a hard disk.

Alternatively, the information medium can be an integrated circuit in which the program is incorporated, the circuit being adapted to execute the method in question or to be used in its execution.

BRIEF DESCRIPTION OF THE DRAWINGS

How the present disclosure may be put into effect will now be described by way of example with reference to the appended drawings, in which.

DESCRIPTION OF THE EMBODIMENTS

An exemplary method for simulating the illumination of an indoor scene will now be described. This method aims at simulating the illumination of an indoor scene at a given instant, typically in near real time. Also, in the present description, the simulation is aimed at performing a tracking of the position of the camera observing the scene. The disclosure is however not limited to tracking this position and can also be applied to other applications in which it is required to use a simulation of the illumination.

The method limits the computational load to be performed in near real-time. This results from the fact that a portion of the computations is performed once, another portion is performed for example every five minutes, and the final portion is done in real time.

Figure 1:
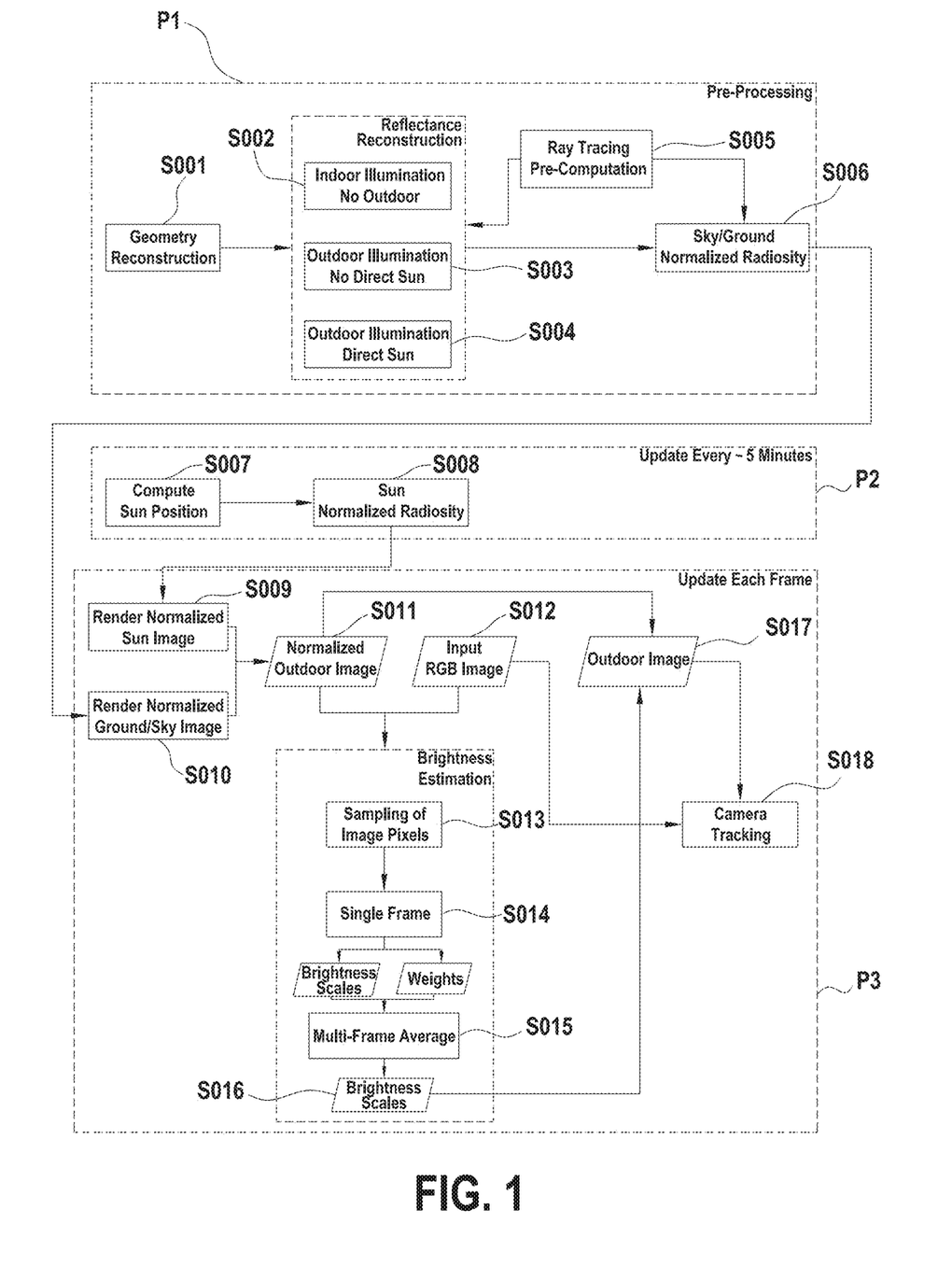
FIG. 1 is a graphical representation of a pipeline to implement the steps of the method according to an example.

FIG. 1 shows the steps of a method according to an example. In a first phase P1 (which needs be performed only once for a given scene), the method comprises a step S001 of reconstructing the 3D geometry of the scene. In some embodiments, this can be done on the basis of an image of the scene (an RGB image or an RGBD image, and eventually a plurality of images), and the pose of the camera (at this stage, this pose can be provided). The output of this step is the 3D geometric model of the scene in the form of a 3D mesh. The 3D geometric model of the scene can be obtained by Truncated Signed Distance Field (TSDF) integration, which requires a depth image stream scanning the scene and the corresponding camera poses. It should be noted that if this method is used, the RGBD images should be acquired when there is no direct sun light visible in the scene as most RGBD cameras operate using a near-infrared sensor which fails in bright sun light.

The disclosure is not limited to the use of images to reconstruct the 3D geometry of the scene and can also use 3D geometry models prepared by an operator.

Subsequently, a step in which reflectance maps (i.e. reflectance values at each vertex) will be acquired is performed. In some embodiments, this step uses as input the 3D geometry model of the scene, images of the scene and camera poses.

While not represented, the method can include a step of obtaining image information of the scene.

It should be noted that the reflectance $\rho$ of a vertex $v_i$ is defined as the ratio between the incoming light $E(v_i)$ (also called the irradiance) and the reflected light $B(v_i)$ (also called the radiosity) at vertex $v_i$:

$$B(v_i)=\rho(v_i)E(v_i) \qquad \text{Equation (1)}$$

The radiosity can be measured (from image information) and used together with the scene geometry, to compute the irradiance, as will be shown hereinafter. Outdoor illumination complicates this procedure in two ways, first, it is not possible to reconstruct the outdoor geometry with current RGBD sensors, and the sky does not have a proper geometry in its common sense. Further, the sun radiosity is typically too high to be captured directly by consumer-grade RGBD cameras. The following described method overcomes this difficulty.

More precisely, the subsequently described steps S002, S003, and S004 are three alternative steps that can be used to obtain reflectance maps from image information (one or more images).

Step S002 is an alternative which is only represented for the sake of completeness as it represents a case where there is no outdoor illumination. This step implements the method of document "Camera tracking in lighting adaptable maps of indoor environments" further discloses how to obtain radiosity maps/reflectance maps and of European Patent Application 20 154 742.9 filed on Jan. 30, 2020.

If the scene is lit by artificial light sources only, which are all inside the scene, it is possible to use the method known to the person skilled in the art as the "radiosity transport" method, which solves the equation system given by $$B(v_i) = \rho(v_i)\sum_{j\neq i}B(v_j)F(v_i, v_j)G(v_i, v_j) \qquad \text{Equation (2)}$$

for all vertices $v_i$, and wherein $F(v_i,v_j)$ is the form factor describing the geometrical relation between vertices $v_i$ and $v_j$, and $G(v_i,v_j)\in\{0,1\}$ the visibility equal to "1" if the line of sight between vertices $v_i$ and $v_j$ is free (i.e. not blocked).

Radiosity values $B(v_i)$ are recovered from scanning the scene with an RGB camera while varying the camera's exposure time.

Step S003, actually part of the present disclosure, is a first alternative step of obtaining a reflectance map of the scene for the contribution of outdoor illumination to the scene based on the 3D geometry model of the scene. This alternative is particularly suitable for scenes which receive outdoor light but not direct sunlight. In this case, the the brightness of the sky is low enough to be directly measured on image information with a consumer grade RGB(D) camera (i.e. the image information can be obtained by acquiring at least one image of the scene with this outside illumination). In this step, it is considered that light is passing for example through a window but no direct sunlight is visible in the scene itself. Thus, the radiosity can be measured as in the above described step S002, while the geometry outside this window is still missing (there are no vertices onto which the radiosity can be projected).

To overcome this difficulty, the outdoor geometry is modeled as a sphere or a sky sphere. This sphere is formed by a set $\mathcal{L}$ of sample points (i.e. light sources) placed on the sphere. Each point $\mathcal{L}$ is associated with a direction n(l) and a radiosity B(l). This radiosity is recovered by projecting parts of the input image (or images if a plurality of images of the scene is used), which do not fall onto the scene geometry, onto the sky sphere instead. Then, a slightly modified equation 2 can be used for reflectance recovery:

$$B(v_i) = \rho(v_i)[E_s(v_i) + E_l(v_i)] \quad \text{Equation (3)}$$

Wherein $E_s$ is the irradiance from the scene and $E_l$ is the irradiance from l, with:

$$E_s(v_i) = \sum_{j \neq i} B(v_j) F(v_i, v_j) G(v_i, v_j) \quad \text{Equation (4)}$$

as before, and:

$$E_l(v_i) = \sum_{l \in \mathcal{L}} B(l) F(v_i, l) G(v_i, l) \quad \text{Equation (5)}$$

where $F(v_i, l) = -\cos(n(l) \cdot n(v_i))$ and $G(v_i, l) = 0$ if and only if the ray n(l) intersects any scene geometry other than $v_i$ and 1 otherwise.

Figure 2:
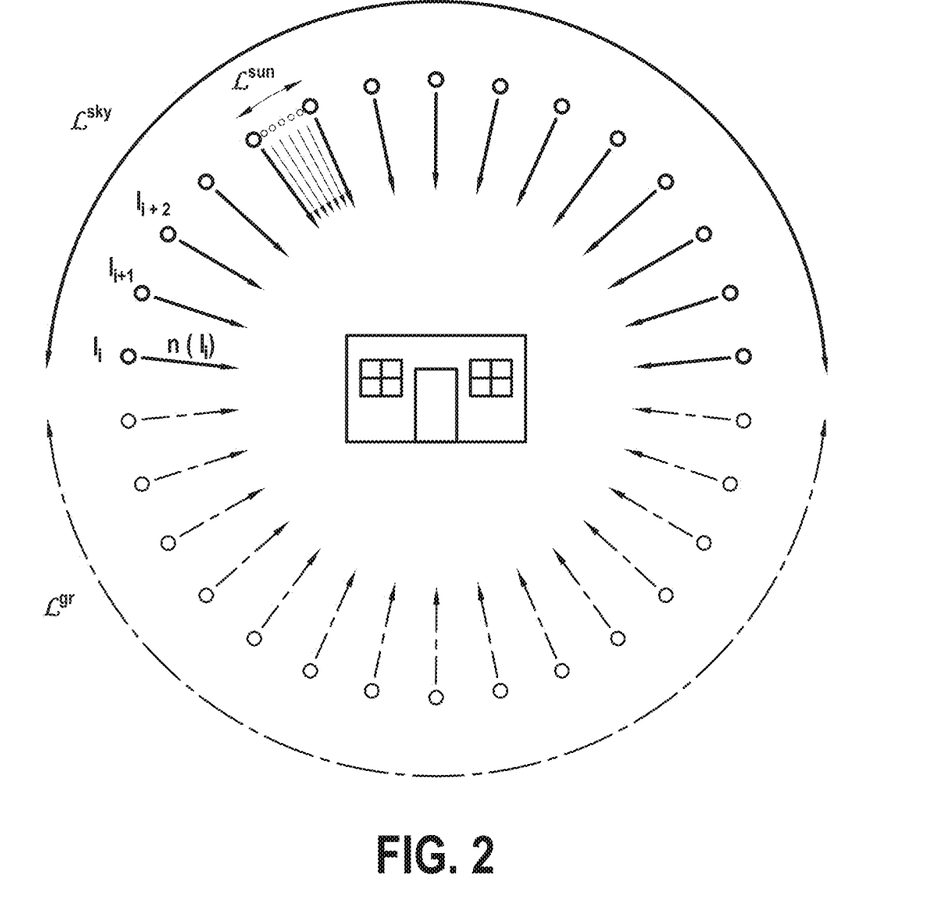
FIG. 2 is a schematical representation of a sphere associated with outside illumination.

The above defined sphere will be better described in reference to FIG. 2.

Step S004 is another alternative for recovering the reflectance map. This alternative is particularly suitable for applications where the scene will receive direct sunlight.

In this alternative, the sun is considered to be directly visible from the inside, in the scene. Theoretically, this could be handled analogously to step S003, however, the minimal exposure time of most RGBD cameras is not short enough to capture the sun's radiosity. In other words, orienting a camera directly towards the sun does not allow measuring B(l) for a point placed on the sphere where the sun is $l \in \mathcal{L}^{sun}$ with $\mathcal{L}^{sun}$ being a set of points placed where the sun is, better described hereinafter in reference to FIG. 2.

Thus, since the sun, if present/visible, is the dominant light source in the scene, we cannot reliably recover the reflectance using radiosity transport directly.

Nevertheless, under certain assumptions and as will be described hereinafter, a meaningful scene reflectance can be estimated, in particular by using at least two images of the scene (from the image information) where the scene receives outdoor illumination and direct sunlight, taken at different instants associated with different positions of the sun.

Let $\mathcal{L}_{t1}^{sun}$ be a set of points arranged on the above-mentioned sphere within the sun circle (the circle appearing where the sun is located), or in other words the sky area covered by the sun at time t1 (an instant at which a first image has been captured). Further, let $V_{t1}^{sun}$ be the set of vertices lit by direct sun light, i.e. $v \in V_{t1}^{sun}$ if and only if $F(v,l)G(v,l) > 0$ for a given $l \in \mathcal{L}_{t1}^{sun}$. It is assumed that $B_{t1}(l)$ is the same for all $l \in \mathcal{L}_{t1}^{sun}$, and this leads to only having one unknown, the sun radiosity denoted $B_{t1}^{sun}$. It should be noted that for all other vertices not in $V_{t1}^{sun}$ it is possible to recover the reflectance as they only depend on the scene or sky radiosities, which can be measured. By capturing the scene again at a different time of day $t_2$ (an instant at which a second image has been captured, chosen so that the position of the sun differs between the two instants, the larger the difference in position the better—or, alternatively, a difference of at least one vertex should be obtained between $V_{t1}^{sun}$ and $V_{t2}^{sun}$ defined hereinafter), it is possible to recover $B_{t1}^{sun}$. Let $V_{t2}^{sun}$ be defined similarly to $V_{t1}^{sun}$ and $V_{t1-t2}^{sun}$ the set of vertices in $V_{t1}^{sun}$ but not in $V_{t2}^{sun}$, i.e. lit by direct sunlight at t1 but not at $t_2$. It is then possible to recover the sun brightness/radiosity $B_{t1}^{sun}$ from any vertex $v \in V_{t1-t2}^{sun}$ by exploiting the fact that the reflectance $\rho(v)$ is the same at t1 and t2. Solving the above presented equation 3 for $\rho(v)$ at t2 and inserting it in equation 3 for t1, it is possible to obtain:

$$B_{t1}(v) = \frac{B_{t2}(v)}{\left[E_s^{t2}(v) + E_l^{t2}(v)\right]} \left[E_s^{t1}(v) + E_l^{t1}(v)\right] \quad \text{Equation (6)}$$

With $E_s^{ti}(v)$ and $E_l^{ti}(v)$ being respectively the irradiance from the scene and from the sky at instant ti.

In equation 6, all quantities except $E_l^{t1}(v)$ are known. Indeed, $B_{t1}(v)$ and $B_{t2}(v)$ can be measured, $E_s^{t1}(v)$ and $E_s^{t2}(v)$ depend only on scene radiosities and can also be computed from measured values, $E_l^{t1}(v)$ by definition of v depends only on the sky radiosity which is measured as well. $E_l^{t1}(v)$ can be expressed as:

$$E_l^{t1}(v) = E_{sky}^{t1}(v) + B_{t1}^{sun} \sum_{l \in \mathcal{L}_{t1}^{sun}} F(l, v) G(l, v) \quad \text{Equation (7)}$$

With $E_{sky}^{t1}(v)$ computed using the above defined equation 5 using sky radiosities at t1. Using this expression in equation 6 and solving it for $B_{t1}^{sun}$ provides:

$$B_{t1}^{sun} = \left[B_{t1}(v) \frac{\left[E_s^{t2}(v) + E_l^{t2}(v)\right]}{B_{t2}(v)} - \right] / \left[\sum_{l \in \mathcal{L}_{t1}^{sun}} F(l, v) G(l, v)\right] \quad \text{Equation (8)}$$

It should be noted that all the values on the right side are known, thus, it is possible to compute $B_{t1}^{sun}$, use it in the original equation system for t1 and solve for the remaining reflectance values to obtain the reflectance map.

Step S005 can then be carried out (this step is carried out before steps S003 and steps S004 as its output can be used in these steps) in which a ray tracing step is performed to determine the visibility of each vertex of the 3D geometric model. This step uses the 3D geometric model as input and the sky sphere separated into points/light sources, as defined above. This allows obtaining the visibility G in equations 4 and 5, for example through a pre-computation so that these equations can be solved later. This eliminates the main bulk of computation during illumination estimation.

Step S006 can then be carried out in which a normalized radiosity map ($\hat{B}^{sky}$) for the contribution of the sky to the outdoor illumination based on the reflectance map (obtained using either S003 or S004) is elaborated, and in which a normalized radiosity map ($\hat{B}^{gr}$) for the contribution of the ground to the outdoor illumination based on the reflectance map is elaborated.

In the present application, obtaining a normalized radiosity map is performed using the algorithm known to the person skilled in the art as the radiosity algorithm (Cindy M. Goral, Kenneth E. Torrance, Donald P. Greenberg, and Bennett Battaile. 1984. "Modeling the interaction of light between diffuse surfaces". SIGGRAPH Comput. Graph. 18, 3 (July 1984), 213-222). In some embodiments, an iterative version of the radiosity algorithm is used.

At this stage, the reflectance of each vertex of the scene is known,

It is possible to obtain the normalized radiosities from the light sources and their brightness, G, F, and the reflectance map. For example, each vertex $v \in V$ has a reflectance $\rho(v)$, the radiosity B(v) here is the amount of light reflected by the surface patch at v, and $B^x(v)$ is the radiosity from light source $\mathcal{L}^x$. In order to estimate $B^x(v)$, it is possible to first compute the radiosity $B^l(v)$ induced by a single directional light source $l \in \mathcal{L}^x$ and then to sum up these components. Then, and as mentioned before, an iterative version of the basic radiosity algorithm is used, with:

$$B_0^l(v_i) = \rho(v_i) S^l F(l, v_i) G(l, v_i)$$

being the light reaching the scene directly from l, and $B_{k+1}^l(v_i) = \rho(v_i) \rho_{j \neq i} B_k^l) F(v_i, v_j) G(v_i, v_j)$ being an iterative estimate for light inter-reflections within the scene. The form factor $F(v_i, v_j)$ is computed as in document "Building dense reflectance maps of indoor environments using an rgb-d camera" (M. Krawez, T. Caselitz, D. Büscher, M. Van Loock, and W. Burgard, in 2018 IEEE/RSJ International Conference on Intelligent Robots and Systems (IROS). IEEE, 2018, pp. 3210-3217), for a direction light source $F(l, v_i)$, which simplifies to $-\cos(n(l) \cdot n(v_i))$. Also, the visibility term $G(v_i, v_j)$ is 1 if the line of sight between $v_i$ and $v_j$ is free, and 0 otherwise. Similarly, $G(l, v_i) = 1$ only when the ray with direction n(l), starting at $v_i$, does not intersect with any scene geometry. For example, $B^l(v_i) = B_K^l(v_i)$, with K=10 by way of example, and $B^x(v_i) = \Sigma_{l \in \mathcal{L}^x} B^l(v_i)$. Setting $S^l$ to 1 in the above equation provides a normalized radiosity $\hat{B}^x$.

To adapt the 3D geometric model to the current outdoor illumination in real time, a simplified model is used consisting of sun, sky, and ground light components. The radiosity of each vertex v is given by $B(v) = B^{sun}(v) B^{sky}(v) + B^{gr}(v)$. The sky and ground components are computed by first splitting the sky sphere into two disjoints sets $\mathcal{L}^{sky}$ and $\mathcal{L}^{grd}$, and adding the set of bins $\mathcal{L}^{sun}$ describing the sun area. Then, equation 3 can be used to compute the radiosity contributions of each of the three light sources.

Here, it is assumed that the sun, sky, and ground bins l have the same radiosities (or brightness scales) $S^{sun}$, $S^{sky}$, and $S^{gr}$ respectively, such that the term B(l) in equation 5 can be replaced by the proper brightness scale parameter $S^x$, with $x \in \{sun, sky, gr\}$ (with gr for ground). In this case, the linearity of the radiosity transport equations allows pulling out $S^x$ from the computation and to scale the vertex radiosities subsequently, i.e. $B^x(v) = \hat{B}^x(v) S^x$. $\hat{B}^x$ is called a normalized radiosity.

For the sky and the ground, it is possible to pre-compute the normalized radiosities to speed up the scene re-lighting. Given $\hat{B}^{sky}$ and $\hat{B}^{sun}$ for each vertex, these normalized radiosities will then be multiplied by the corresponding brightness scale parameters in near real time, around the instant at which it is desired to simulate the illumination.

A second phase P2 can be carried out. By way of example this second phase can be carried out every 5 minutes, or any duration of the order of 5 minutes, as the sun moves slowly throughout the day.

In step S007 of the second phase, the position of the sun is computed using the scene geolocation (i.e. latitude and longitude), the orientation of the scene, the time (i.e. yyyy.mm.dd.hh.mm.ss). The position of the sun can be expressed as a direction vector to reflect the sun direction relative to the scene.

In order to simulate the sun illumination correctly, it is required to known the sun position relative to the scene at any given time. This can be calculated analytically by an astronomical model.

Using the sun position (for example expressed as a direction), it is possible to obtain the normalized radiosity map ($\hat{B}^{sun}$) for the contribution of the sun to the outdoor illumination in step S008. This step also uses the reflectance map, the visibility terms G, and the 3D geometric model of the scene.

Unlike the sky and ground contributions, the sun changes its relative position to the scene depending on time, therefore a radiosity pre-computation carried out in the first phase is not possible. $\hat{B}^{sun}$ should therefore be computed for every new sun position. Given that the sun area is much smaller than that of sky or ground, $\hat{B}^{sun}$ is obtained within a couple of minutes using GPU acceleration. Even though this update is not real-time, the sun position varies only very little in the course of minutes, and performing the steps of the second phase can be performed every couple minutes, typically every five minutes.

The final and third phase P3 can be carried out in near real-time, that is to say within a duration which is less than the frame rate from the instant (t) at which it is desired to simulate the illumination.

This phase comprises step S009 in which a normalized image $\hat{I}_t^{sun}$ the scene for the contribution of the sun to the outdoor illumination of the scene is rendered on the basis of $\hat{B}^{sun}$. This step can use an initial pose estimate $T_t^\sim$. This pose is obtained because a frame-to-frame tracking method is used here. Thus, the change of camera pose is computed by matching an input image at instant t to the image of instant t−1. This tracking process is described in more detail in document "Camera Tracking in Lighting Adaptable Maps of Indoor Environments" (T. Caselitz, M. Krawez, J. Sundram, M. Van Loock and W. Burgard, 2020 IEEE International Conference on Robotics and Automation (ICRA), Paris, France, 2020, pp. 3334-3340). Also, the tracking may be done using the method described in the previously mentioned European Patent Application.

Step S010 comprises analogous steps for $\hat{B}^{sky}$ and $\hat{B}^{gr}$ in which normalized images are rendered (respectively $\hat{I}_t^{sky}$ and $\hat{I}_t^{gr}$.

The normalized images can be combined in step S011.

Also, in the third phase, an image $I_C$ of the scene is acquired with the camera in step S012.

The subsequent steps will describe how the brightness scale parameters) $S^{sun}$, $S^{sky}$, and $S^{gr}$ are estimated from the normalized images and the acquired image.

This will be done by adjusting brightness scale parameter values to fit the acquired image.

In step S013, a subset of pixels Ω of the pixels of the image $I_C$ are selected so as to represent the image areas with the most information about illumination and containing the least amount of noise/errors.

In fact, it has been observed that because $T_t^\sim$ can differ from the actual pose of the camera used to capture $I_C$, the reference image $I_C^{ref}$ which will be obtained using the normalized images and the brightness scale parameters can differ from $I_C$. In practice, image noise and errors in the reconstructed scene geometry and reflectance maps, and the simplified outdoor illumination model (i.e. the sphere) prevent this ideal matching. Hence, in some embodiments, Ω is used.

Also, a weight $W^{spl}$ can be used to represent the reliability of Ω for brightness scale estimation. This weight can either be set to 1, or be computed to reflect whether the sampled points are representative for the light distribution in the scene, and how much noise can be expected in these samples.

The brightness scale estimation is carried out in step S014. For a single frame $I_C$ and the samples $u \in \Omega$ the following error Err is minimized for the three brightness scale parameters $S^{sun}$, $S^{sky}$, and $S^{gr}$:

$$Err = \sum_{u \in \Omega} (I_C(u) - CRF(et \cdot I_B(u)))^2 \qquad \text{Equation (9)}$$

With $I_B(u) = \Sigma_{x \in \{sun,sky,gr\}} S^x \hat{I}^x(u)$, CRF( ) being the camera response function, and et the exposure time of $I_C$. The brightness scale parameters are obtained by minimizing Err over $S^x$. This minimization can be performed by a least squares solver.

As an alternative to step S014, step S015 can be performed in which several frames are used.

It has been observed that a single frame can still be error-prone, and that in some embodiments, $S^{sun}$, $S^{sky}$, and $S^{gr}$ are averaged over multiple frames using $W^{spl}$ and Err as weights. In order to cope with dynamic illumination (i.e. clouds passing in front of the sun), it is proposed to use a sliding window approach, where frames behind a time horizon are discarded. It is further proposed to filter out outliers which deviate too much from previous frames. In step S016 the brightness scale is carried out.

Consequently, the simulated image $I_C^{ref}$ in step S017 can be rendered using the rendered normalized images and the brightness scale parameters $S^{sun}$, $S^{sky}$, and $S^{grd}$.

Tracking of the camera position can then be performed in step S018 by comparing $I_C^{ref}$ and $I_C$. As explained above, tracking is performed using methods known to the person skilled in the art.

FIG. 2 is a 2D representation of a cross section of the above-mentioned sphere centered on the scene. As can be seen on the figure, the points considered to be light sources are aligned on the sphere. More precisely, the points of $\mathcal{L}^{sky}$ are aligned in the upper hemisphere while the points $\mathcal{L}^{gr}$ are aligned in the lower hemisphere. These points are spaced regularly around the sphere.

Also, on this figure, for each point $l_i$, the direction $n(l_i)$ is represented by an arrow.

It should be noted that for the sun, a limited number of points are used where the sun appears to be when seen from the scene (points $\mathcal{L}^{sun}$). The points of $\mathcal{L}^{sun}$ are more densely spaced than the points of $\mathcal{L}^{sky}$ and $\mathcal{L}^{gr}$.

In order to recover the reflectance in either step S003 or step S004, a radiosity value is affected by projecting a portion of the image to the point li, as explained above.

Figure 3:
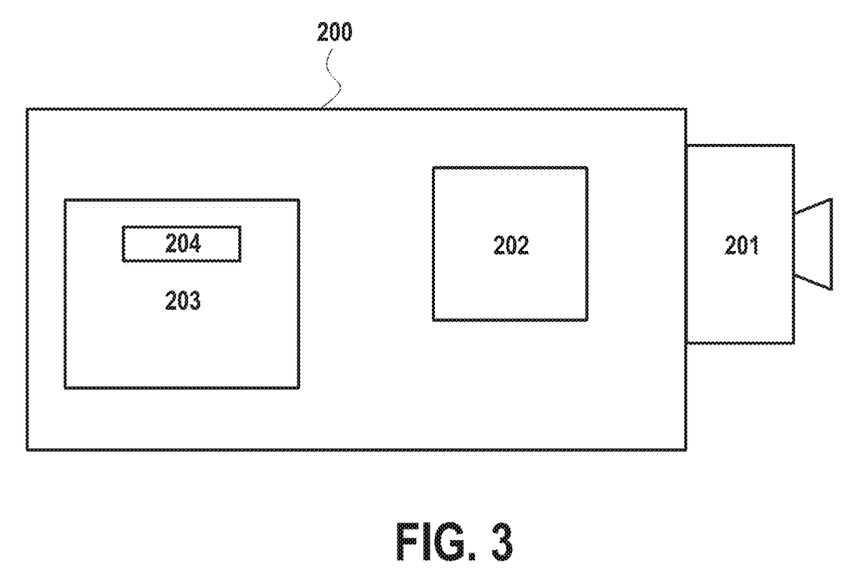
FIG. 3 is a representation of a system according to an example.

FIG. 3 shows a system 200 configured to perform the method described in reference to FIG. 1. This system is equipped with a camera 201 (for example an RGBD camera), and has a computer structure. The system comprises a processor 202, and a nonvolatile memory 203. In this nonvolatile memory 203, a set of computer program instructions 204 is stored. When these instructions 204 are executed by processor 202, the steps of the above defined method are performed.

Figure 4A:
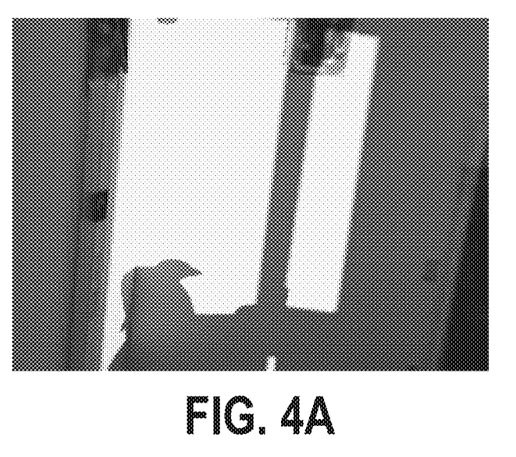
FIG. 4A is an image of an indoor scene
Figure 4B:
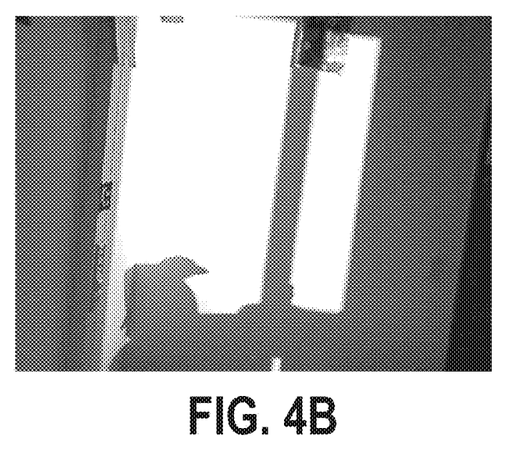
FIG. 4B is the corresponding rendered image of the image of the indoor scene.

FIG. 4A is an image rendered by the present method, while FIG. 4B is the actual image acquired by the camera. It can be scene that the illumination simulation provides a good simulation of the actual scene.

Figure 5A:
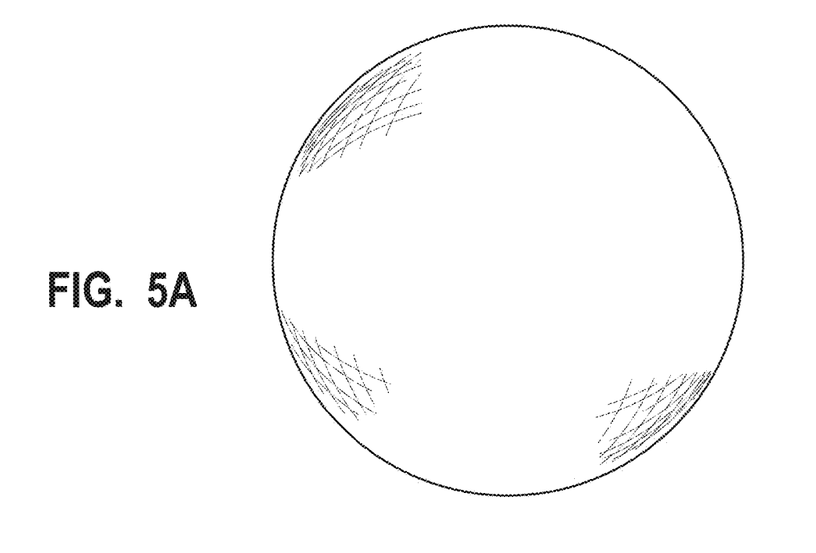
FIG. 5A represents a sphere representing outdoor illumination

FIG. 5A is an image of a sphere of bins centered around the scene and determined in the above steps.

Figure 5B:
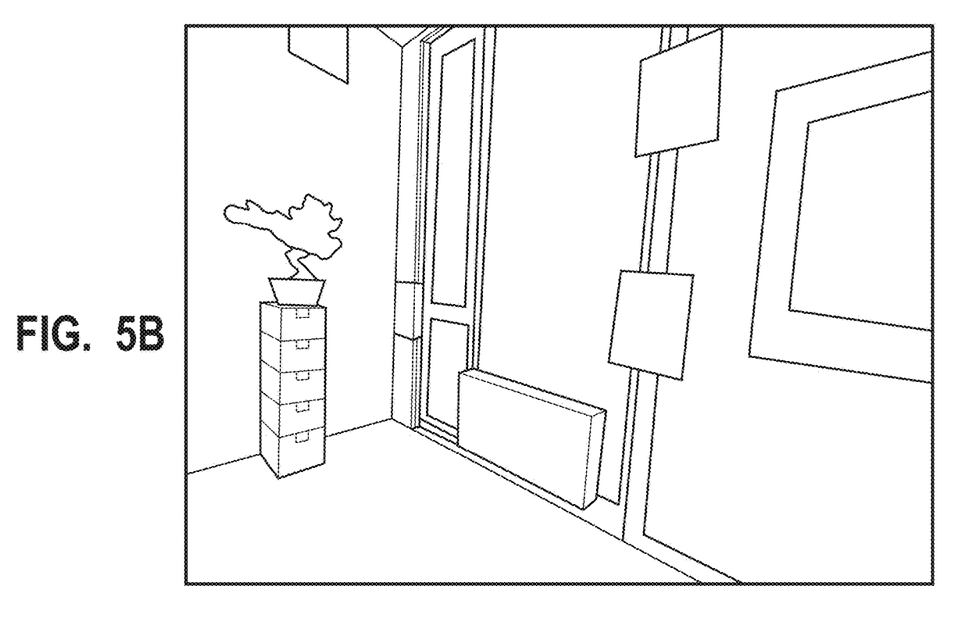
FIG. 5B is a representation of how this sphere is observed from the inside.

FIG. 5B shows how this sphere is seen from the camera: this is an approximation of the outside which does not take into account the exact geometry of the outside but provides a good estimation of the illumination.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

What is claimed is:

1. A method for simulating, at an instant, an illumination of an indoor scene observed by a camera and being illuminated by outdoor light, the method comprising:
 a first preliminary phase including:
  obtaining a 3D geometric model of the scene,
  obtaining image information of the scene,
  obtaining a reflectance map of the scene for a contribution of outdoor illumination to the scene based on the 3D geometric model of the scene and the image information of the scene, wherein obtaining the reflectance map comprises considering a plurality of light sources arranged on a sphere centered on the scene,
  elaborating a normalized radiosity map for a contribution of the sky to the outdoor illumination based on the reflectance map wherein elaborating the normalized radiosity map for the contribution of the sky to the outdoor illumination based on the reflectance map comprises only considering the light sources in the upper half of the sphere,
  elaborating a normalized radiosity map for a contribution of a ground to the outdoor illumination based on the reflectance map wherein elaborating the normalized radiosity map for the contribution of the ground to the outdoor illumination based on the reflectance map comprises only considering the light sources in the lower half of the sphere,
 a second phase carried out within a first given duration from the instant including:
  obtaining a position of the sun using geolocation, time, and orientation of the scene,
  obtaining a normalized radiosity map for a contribution of the sun to the outdoor illumination based on the position of the sun and the reflectance map,
 a third phase carried out within a second given duration from the instant, shorter than the first given duration, including:
  acquiring at least one image of the scene,
  determining from the at least one image a brightness scale parameter for the contribution of the ground, a brightness scale parameter for the contribution of the sky, and a brightness scale parameter for the contribution of the sun, rendering a normalized image of the scene for the contribution of the sky to the outdoor illumination of the scene based on the normalized radiosity map for the contribution of the sky to the outdoor illumination, rendering a normalized image of the scene for the contribution of the ground to the outdoor illumination of the scene based on the normalized radiosity map for the contribution of the sky to the outdoor illumination, and rendering a normalized image of the scene for the contribution of the sun to the outdoor illumination of the scene based on the normalized radiosity map for the contribution of the sky to the outdoor illumination.

2. The method of claim 1, wherein the preliminary phase comprises a ray-tracing step to determine a visibility of each vertex of the 3D geometric model, the method further comprising using the visibilities to obtain the normalized radiosity maps for the contribution of the sky, of the ground, and of the sun.

3. The method of claim 1, wherein obtaining the reflectance map comprises using image information of the scene acquired when there is no direct sunlight entering the scene.

4. The method of claim 1, wherein obtaining the reflectance map comprises using image information of the scene acquired when there is direct sunlight entering the scene at different instants associated with different positions of the sun.

5. The method of claim 1, wherein determining from the image a brightness scale parameter for the contribution of the ground, a brightness scale parameter for the contribution of the sky, and a brightness scale parameter for the contribution of the sun, comprises minimizing a difference between the image and a linear combination of products of each brightness scale parameter with the corresponding normalized image.

6. The method of claim 1, wherein the third phase comprises acquiring a plurality of images of the scenes at different instants and determining the brightness scale parameters uses the plurality of images.

7. The method of claim 1, comprising elaborating an image of the scene from the normalized images of the scene and the brightness scale parameters.

8. The method of claim 7, wherein the method for simulating the illumination of an indoor scene is the method in accordance with claim 7, and wherein tracking is performed on the image elaborated from the normalized images of the scene and the brightness scale parameters.

9. A method for tracking the position of a camera observing a scene over a plurality of instants, using the simulated illumination of the indoor scene by the method for simulating the illumination of an indoor scene in accordance with claim 1 at every instant of the plurality of instants.

10. A system comprising a camera and a control unit configured to perform the method according to claim 1.

11. A nontransitory recording medium readable by a computer and having recorded thereon a computer program including instructions for executing the steps of a method according to claim 1.

* * * * *